United States Patent [19]

Giammarco

[11] 3,714,327
[45] Jan. 30, 1973

[54] GAS PURIFICATION PROCESS

[76] Inventor: Giuseppe Giammarco, San Marco 3242, Piazzale Morolin, Venice, Italy

[22] Filed: Oct. 13, 1969

[21] Appl. No.: 865,852

[52] U.S. Cl. ............................................423/220
[51] Int. Cl. ...............................................B01d 53/34
[58] Field of Search..........23/2, 2.3, 3, 3.3, 150, 181, 23/4

[56] References Cited

UNITED STATES PATENTS

| | | | |
|---|---|---|---|
| 2,943,910 | 7/1960 | Giammarco | 23/2 R |
| 3,039,845 | 6/1962 | Steinrotter | 23/2 R |
| 2,860,030 | 11/1958 | Goldtrap et al. | 23/2 |
| 2,886,405 | 5/1959 | Benson et al. | 23/3 |
| 2,890,931 | 6/1959 | McCreary | 23/2 X |
| 3,042,483 | 7/1962 | Wolfram et al. | 23/2 |

Primary Examiner—Earl C. Thomas
Attorney—Sughrue, Rothwell, Mion, Zinn & Macpeak

[57] ABSTRACT

In a process for removing $CO_2$ and like acid gases from a gaseous mixture by an absorption solution which is regenerated by boiling above atmospheric pressure, the improvement which is removing the boiling solution from the regeneration and injecting it into an expansion zone, whereby a stream of vapor results containing a portion of the $CO_2$ etc. from the absorption solution which, being cooled with a reduced $CO_2$ etc. content is returned to the absorption zone. The stream of vapor is vented.

3 Claims, 22 Drawing Figures

GAS PURIFICATION PROCESS

FIELD OF THE INVENTION

The present invention relates to processes for eliminating from gaseous mixtures acid impurities such as $CO_2$, $H_2S$, HCN and similar impurities, separately or cumulatively, and constituted by an absorption phase in which the gaseous mixtures are washed with absorbent solutions of an appropriate chemical composition and nature, and a regeneration phase in which the absorbent solutions are regenerated by means of boiling and giving rise to expulsion of the acid impurities absorbed.

DESCRIPTION OF THE PRIOR ART

It is well known that in the majority of cases it is suitable and more often than not necessary for the temperature during the absorption phase to be less than that in the regeneration phase in which the solution is heated to boiling temperature. Consequently, by virtue of the aforesaid temperature difference, it is fundamentally important for the heat expended in heating the solution from the absorption temperature to the boiling temperature (in other words the heat contained in the boiling regenerated solution which emerges from the regeneration phase) to be suitably utilized for the purposes of the process instead of being uselessly eliminated through a coolant which, inter alia, represents an element of cost.

Hitherto, the heat content of the boiling regenerated solution has been used in diverse ways by the various cycles employed in industrial practice, of which the best known are the conventional, isothermic and optimal cycle.

In the conventional cycle, from what is known, the absorption temperature is substantially less than the regeneration temperature; it is also well known that by using ethanol amine solutions (MEA, DEA, TEA) or other solutions of organic compounds, in the cases of absorption of both $CO_2$ and $H_2S$, the absorption temperature is close to ambient temperature. In this cycle, it is well known that the heat content of the boiling regenerated solution is used for heating the exhausted solution before this latter is passed to the regenerator. For the purpose, a heat exchanger and a coolant are used, interposed between the absorber and the regenerator. However, it is a known fact that the said heat exchanger is very expensive and alone represents a considerable percentage of the cost of the plant.

It would therefore be highly desirable for the conventional cycle to be modified and improved as is one of the objects of the present invention so that, while the absorption phase involves temperatures fairly close to ambient temperature, the heat exchanger mentioned may be eliminated.

The isothermic cycle does not utilize the heat in the boiling regenerated solutions. As is well known, it dispenses with the heat exchanger by virtue of the fact that the boiling regenerated solution is passed directly to the absorber. This advantage is however cancelled out by the fact that the absorption temperatures are considerably high and generally higher than the so-called optimum temperatures (as defined hereinafter and corresponding to the minimim volume and the minimum height of the absorption column), and also basically by the fact that the heat content of the boiling regenerated solutions, after being passed disadvantageously along the absorber, is finally eliminated to outside by means of the cooler employing $CO_2$ (or other acid gases) which must be constructed from steel capable of withstanding the corrosive properties of the said acid gases, entailing an increase in the cost of the plant.

It would therefore be desirable for the isothermic cycle to be modified and improved, as is the object of the present invention.

The optimum cycle is characterized by the fact that the boiling regenerated solution is slightly cooled (generally to 85° to 90°C in the case of mineral solutions, such as solutions of ordinary or activated carbonate) so that the solution, descending along the absorber and becoming heated by the heat of reaction and the heat contributed by the gas which is to be purified, reaches a temperature of at least 98° to 105°C, sufficiently to be passed directly to the regenerator with no need for a heat exchanger. This produces the advantage of eliminating the heat exchanger from the conventional cycle; another advantage is that the heat furnished by the functioning of the cycle is not entirely eliminated by the $CO_2$ cooler, as in the isothermic cycle and constructed in stainless steel, but is in part eliminated by means of the regenerated solution cooler which on the other hand is more economically constructed in carbon steel and is moreover less expensive by virtue of a more favorable difference in temperature.

It is also well known that one of the characteristic features of this cycle is the fact that the absorption temperature is close to the so-called optimum temperatures (hence the name 'optimum cycle'). It is as well to recall the fact that an increase in temperature improves the Kga coefficient of the alkaline carbonate solutions, whereas on the other hand the $CO_2$ and $H_2S$ vapor tensions rise. The aforesaid two effects, opposite and contrasting, of the rise in temperature, determine the so-called optimum temperature to which—as defined by Sherwood—correspond the best conditions of absorption, in other words the minimum volume and minimum height of the absorption column. The optimum cycle can utilize the heat in the boiling regenerated solution since the solution cooler is for practical purposes replaced by a heat exchanger-recuperator, in which the boiler feed water is heated.

It would be desirable for the optimum cycle, while retaining the aforesaid characteristic features, to be modified and improved, as is the object of the present invention, so that the heat contained in the boiling regenerated solutions is better utilized for the useful purposes of the purification process itself.

The object of the present invention is to use the heat content of the boiling regenerated solutions in order to improve the degree of regeneration of the solutions themselves. Another object of the invention is to diminish the supply of heat necessary for operation of the cycle.

Another object of the invention is partly or completely to eliminate the heat exchanger between hot regenerated solution and cold exhausted solution in cases where absorption is carried out at a temperature lower than the regeneration temperature. Another object of the present invention is considerably to reduce the cost of the plant.

SUMMARY OF THE INVENTION

The present invention is based on the fact that the heat contained in the regenerated solution, hot or boiling, is extracted in the form of a stream of vapor which is basically used in order to extract from the regenerated solution part of the $CO_2$ and/or other acid gases contained therein, so improving the degree of regeneration.

The extraction of the vapor flux is carried out by various methods, as suggested in the description of the present invention, and consisting basically in subjecting the solution to a drop in pressure or to a treatment with inert gases.

As stated above, extraction of the vapor flux is facilitated by passing it into a colder zone where the said vapor condenses and preferably by bringing it into intimate and direct contact with the colder exhausted solution originating from the absorption column, for the purpose of heating this. In this way, the heat contained in the hot regenerated solution passes to the cold exhausted solution more simply and economically than by means of the expensive heat exchanger hitherto used in prior art arrangements and which can therefore be wholly or completely eliminated. Furthermore, there is greater efficiency in the use of heat in that, as will be specified hereinafter under e), the solution can be estimated to eliminate a quantity of $CO_2$ greater than that eliminated by using the heat exchanger.

A further advantage resides in the fact that the passage of vapor from one solution to the other occurs spontaneously and with no consumption of energy, this until such time as the two solutions have reached equality of temperature, and more precisely equality of the respective water vapor tensions.

DESCRIPTION OF THE PREFERRED EMBODIMENTS

Figure 1:
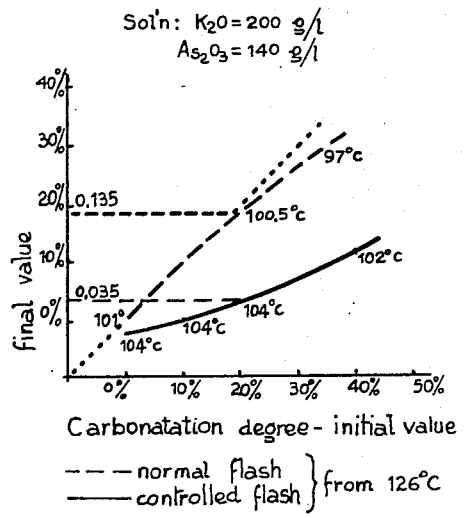
FIG. 1-5 show initial and final carbonate contents of specific absorbent solutions when flashed normally (i.e., instantaneously) and controllably (i.e., gradually)
Figure 2:
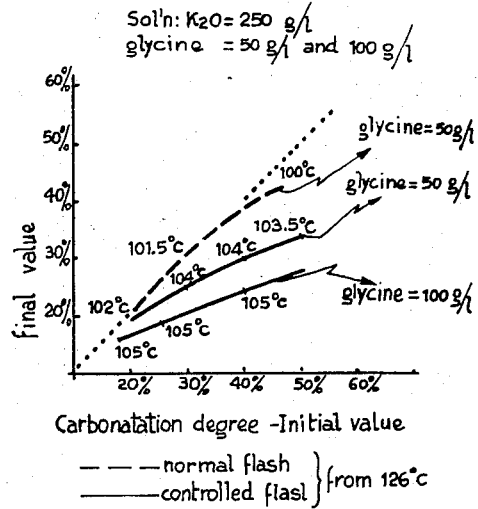
Figure 3:
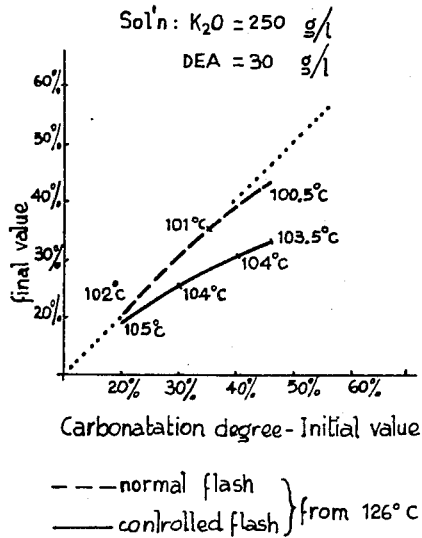
Figure 4:
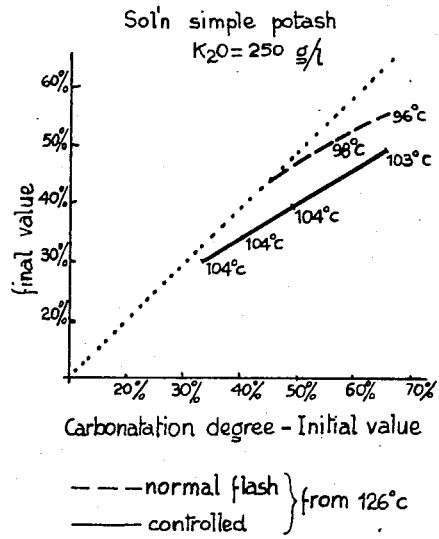
Figure 5:
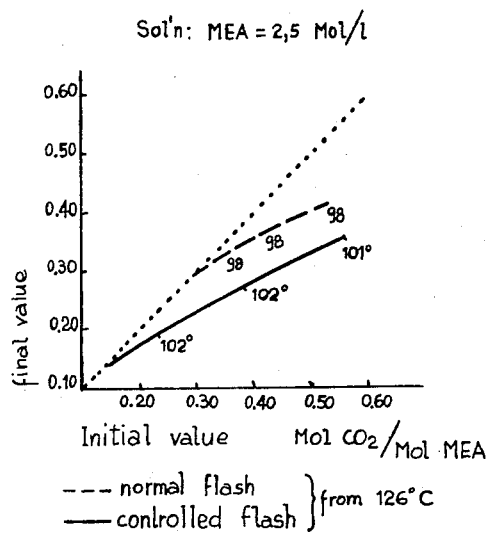

It is now intended to set forth information concerning the extraction of the vapor flux from the regenerated solution and its use to eliminate part of the $CO_2$ and/or other acid gases contained in the solution itself.

This advantage is perhaps the most important in the present invention, by virtue of the fact that the better degree of regeneration which is thus achieved would, according to the hitherto known state of the art, require the supply of close to double the amount of heat to the regenerating column.

The above-mentioned regenerative improvement in regenerated solutions by using the heat contained in the solutions themselves is a new fact and one of which there has been no record in the prior art, and moreover it is surprising both in itself and also by virtue of the fact that the heat extracted from the solution and consumed by the aforesaid improvement may in certain cases even be less than that which normally ought to be supplied to a conventional regenerating column in order to achieve the same effect.

Indeed, as claimed in the present invention, the aforesaid improvement in the degree of regeneration requires that the alkaline carbonate solutions contain particularly effective activators (preferably activators of an acid nature such as $As_2O_3$, glycine (amino acids) and the like); furthermore, it requires extraction of the vapor from the hot or boiling regenerated solution to be carried out with the special apparatus which will be suggested and described hereinafter or the other apparatus which is the object of Italian Pat. application No. 51,679 which is a patent linked with the present.

1. One of the most simple and easily applied methods of extracting the vapor flux from the hot or boiling regenerated solution and hereafter referred to as Case 1 is that of expanding the regenerated solution itself from an above atmospheric pressure to a pressure close to atmospheric.

This is the case which arises in industrial practice, when the regenerating column is functioning at above atmospheric pressure in order to produce pressurized $CO_2$, as is ideal if the $CO_2$ is intended for urea production. Generally, a pressure of approx. 2 to 2.5 atm. abs. is selected. In such a case, a simple or activated alkaline carbonate solution boils at a temperature of approx. 125° to 130°C and leaves the regenerating column at the above-mentioned temperature.

A similar case arises even if the regenerating column is a column with plates which, as is well known, give rise to an increase in pressure at the bottom of the regenerating column and a consequent rise in the boiling temperature of the solution. In these cases, the vapor flux is easily extracted from the regenerated solution by causing the solution itself to expand to atmospheric pressure and with no need for mechanical or similar apparatus which is nevertheless required in the other cases described hereinafter.

The regenerative effect which is obtained by extracting the vapor flux from the solution has been the object of appropriately conducted experiments in which the best known and most important absorbent solutions have been used, such as the solutions of potassium arsenite, solutions of alkaline carbonate activated by the addition of glycin, or by the addition of DEA, solutions of simple potassium carbonate, solutions of monoethanol amine or other ethanol amines.

The aforesaid solutions have been used in experiments at temperatures in all cases regulated initially at 126°C, the solutions being subjected to a gradual and slow reduction in pressure until atmospheric pressure is attained.

The best and simplest method used in the experiments was that of passing the regenerated solution at the initial temperature of 126°C to the bottom of a vessel preferably provided with filling material and filled with liquid to a height of 8 to 10 m. As the solution rises upwardly along the aforesaid vessel there is a reduction in pressure acting on the liquid. This reduction in pressure is due to the decreasing height of liquid in the column that remains above the solution as it moves upwardly. Consequently, as the pressure progressively and gradually decreases, there develops a vapor flux. The period of dwell of the solution in the expansion vessel has been regulated so that the vapor develops and acts on the solution in the same way and in the same time as would arise in the reboiler of a conventional regenerating column. Other methods have been used for the same purpose, as described in Italian Pat. application No. 51,679. The best experimental results were obtained by discharging the $CO_2$ to the outside as the vapor extracted it from the solution (see FIG. 21). Other comparative experiments were conducted for each solution and for each case, the solution being nevertheless caused to expand simply and instantaneously.

The results of the experiments are set out in FIGS. 1, 2, 3, 4, 5, each relative to a type of solution, the nature and composition of which is marked on the figure itself. The abscissae indicate the initial degrees of carbonatation of the solution, the ordinates the final degrees of carbonatation.

As stated above, the initial temperature was regulated to 126°C and the final temperature, in other words when the solution reaches atmospheric pressure at the top of the expansion vessel, is shown at the various points on the graph itself.

In each figure, the top graph (broken line) represents the results obtained by causing the solution to expand simply and instantaneously (normal flash); the bottom graph (solid line) represents the results when the solution is made to expand as stated above (controlled flash).

Thus, for example (see FIG. 1), a solution of potassium arsenite, 200 g/l $K_2O$ and 140 g/l $As_2O_3$, with an initial temperature of 126°C and 20 percent carbonatation, expanding to atmospheric pressure simply and instantaneously, improves its degree of carbonatation to 18.5 percent, cooling to 100.5°C, so that the regenerative effect is virtually negligible. On the other hand, when the solution is expanded by the method specified above, the solution improves its degree of regeneration to 3.5 percent and cools to 104°C.

This result is extremely interesting and is of great practical importance both because the 3.5 percent degree of carbonatation thus obtained makes it possible to achieve with a single-stage cycle a degree of purity which is generally only obtained by using a two-stage cycle, because it is sufficient in an industrial plant to regenerate the solution to a 20 percent degree of carbonatation by supplying external heat and then improving it to 3.5 percent by causing the solution gradually to expand to atmospheric pressure and by using the heat contained in the solution itself. This makes it possible to reduce the amount of external heat supplied to the reboiler of the regenerating column by approximately half.

The saving on heat obtained as stated above by the present invention is revealed in diagram 6 which relates to the use of potassium arsenite solutions, which are widely used industrially.

Figure 6:
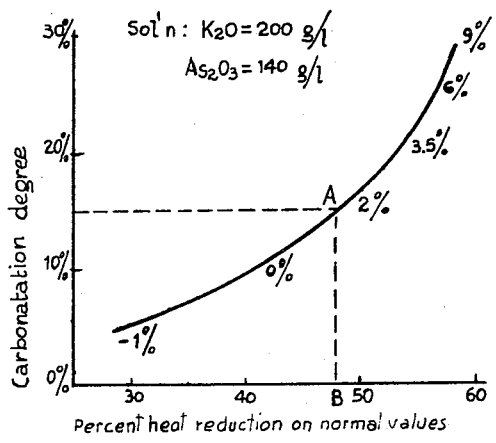
FIG. 6 shows the percent heat reduction realized when the controlled, rather than the normal, flash is utilized for a potassium arsenite solution.
Figure 7:
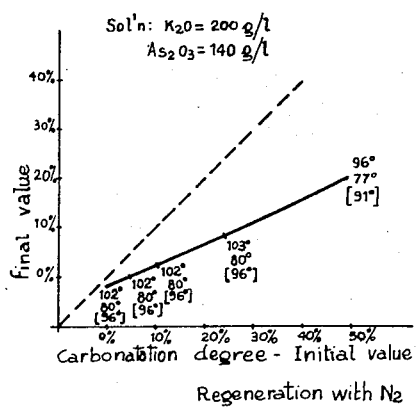
FIGS. 7-11 show initial and final carbonate contents of specific absorbent solutions desorbed using inert gases, both normally and under controlled conditions.
Figure 8:
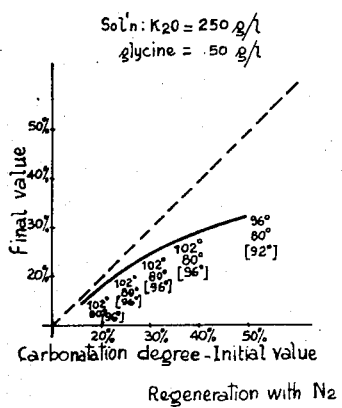
Figure 9:
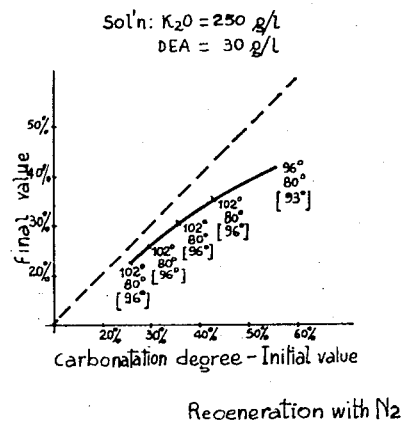
Figure 10:
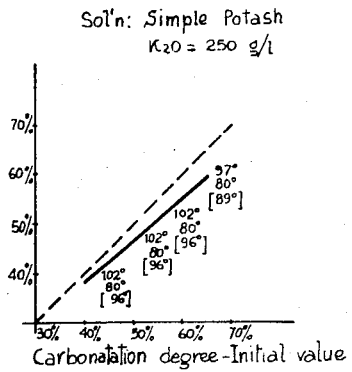
Figure 11:
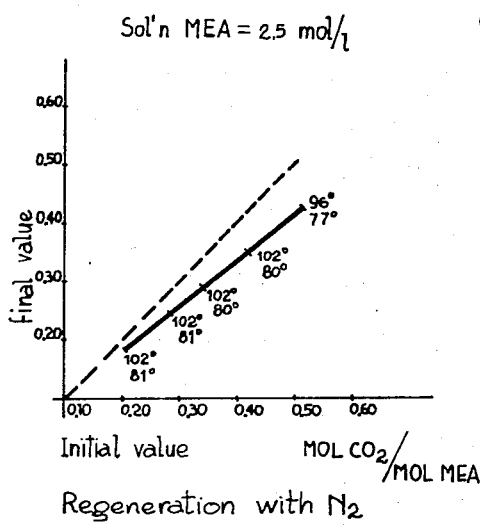

In FIG. 6, the abscissa represents the percentage saving on the supply of heat, the ordinate represents the degree of carbonatation of the solution before expansion, while the final degree of carbonatation after expansion is marked on the various points of the graph.

Thus for example, a solution with an initial degree of carbonatation of 15 percent and with an initial temperature of 126°C, which is obtained from a regenerating column to which 21,500 kg.cal./cu.m. of solution have been supplied, is caused to expand to atmospheric pressure, so obtaining a 2 percent degree of carbonatation (point A on the Figure).

This degree of carbonatation would have required the supply of 40,500 kg.cal./cu.m. of solution of heat to the regenerating column. Consequently, the supply of heat is reduced from 40,500 to 21,500 kg.cal./cu.m. of solution, in other words by 48 percent (point B of the figure, following the broken lines).

FIGS. 2, 3, 4 and 5 relate to the use of other types of absorbent solutions, these being shown on the respective figures, in other words potassium carbonate solutions embodying various activators or solutions of monoethanol amine.

By comparing the results shown on the aforesaid figures, it is revealed that the regenerative effect is a property which alkaline carbonate solutions acquire when activators are added. The regenerative effect is at its maximum for alkaline carbonate solutions activated by the addition of $As_2O_3$; then it diminishes almost negligibly for solutions activated by 100 g/l of glycine, then drops again for solutions activated with 30 g/l of glycine; the drop continues for solutions activated by DEA and ordinary carbonate solutions. The ethanol amine solutions also have a regenerative effect.

Finally, it is manifest that simple and instantaneous expansion does not produce a notable regenerative effect and in fact the broken lines which relate to simple expansion are not substantially remote from the dotted lines which on each diagram indicate that the solution undergoes no regenerative effect during expansion.

2. Another method of extracting the vapor flux from the hot or boiling regenerated solution is to expand the solution, hereafter referred to as Case 2, itself to a below-atmospheric pressure. This is the case with a solution regenerated in a regenerating column functioning at a pressure virtually equal to atmospheric pressure. The solution which in such a case ranges in temperature from 105° to 115°C, is extracted from the regenerating column and made to expand in an expansion or vaporization zone or chamber in which a negative pressure is applied by means of a vacuum pump or other appropriate and opportune mechanical means, preferably including an ejector into which the exhausted solution emanating from the absorption column under pressure is introduced, the energy it contains being utilized as described in Italian Pat. application No. 53,475 which is linked with the present patent application.

Another method of producing a vacuum and suggested in the present invention is that of using in an ejector the purge gases from $NH_3$ or methanol synthesis, these gases being available at a pressure of 100 to 300 atm.

As will be specified hereinafter, the application of vacuum to the solution and the extraction of a vapor flux from the solution requires no consumption of energy if, as claimed in the present invention, the vapor itself is passed into a colder temperature zone and possibly a zone in which the colder exhausted solution is present, which consequently condenses the vapor and becomes re-heated. More detailed information, particularly with regard to the $CO_2$ and/or other acid gases which accompany the vapor, are given in the following section.

In this case, too, as in the present case I, demonstrative and comparative experiments were conducted, using the best known and most important absorbent solutions.

In the aforesaid experiments, the drop in pressure achieves the best results when carried out with apparatus similar to that mentioned in case I, or using the procedures and apparatus suggested and described in Italian Pat. application No. 51,679, which, it is repeated, is linked with the present patent application.

For reasons of operative convenience, the initial temperature of the solution was fixed at 102°C and the final temperature, acting appropriately on the degree of vacuum, was fixed at around 80° to 85°C, which is the temperature considered most suitable for simple or activated alkaline carbonate solutions to be passed to the top of the absorber.

The results obtained by the experiments are completely analagous to those in case I except for the fact that the regenerative effect proved to be slightly less, which must be attributed to the fact that in this case the temperatures in the experiments were lower which reduces the Kga transfer coefficient.

Figure 13:
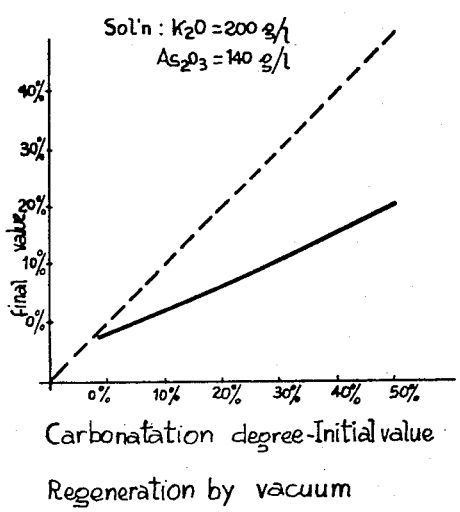
FIG. 13 shows the initial and final carbonate contents of a potassium arsenite solution flashed by vacuum.

By way of illustration of the foregoing statements, FIG. 13 shows the results relative to a potassium arsenite solution; these results are in every respect similar but slightly inferior to those of FIG. 1.

Also in this case, as in the previous case I, the regenerative effect is at its maximum for potassium arsenite solutions, diminishing then for the other types of less activated solutions; it drops still further for simple carbonate solutions. Ethanol amine solutions on the other hand have in this case a lesser regenerative effect than in the preceding case I and this must be attributed to the lower temperature at which the solution is processed.

3. Another method of extracting the vapor flux from the hot or boiling regenerated solution is that of treating the solution itself with desorbent gases, preference naturally being given to the use of gases which are chemically compatible with the solution so as not to cause alterations or chemical decomposition of the solution itself. Particularly indicated for the purpose are purge gases from $NH_3$ or methanol synthesis, gas residues from fractionating apparatus, and combustible gases when they are free from oxygen and $H_2S$.

For this case, too, demonstrative and comparative experiments were carried out, the various types of absorbent solutions hitherto known in industrial practice being used.

In the experiments, the solution had an initial temperature of 102°C. This temperature was chosen for operative convenience, in other words because it was remote from the boiling point of the solution itself. In industrial practice, however, regenerated solutions are generally at a temperature of between 105° to 115°C and therefore, on this basis, the results obtained will be better than those obtained in the experiments described here.

The solution was introduced into the top of a column provided with filling material, in the bottom of which a flow of inert gases (nitrogen) was introduced on a counter current principle, the quantity of inert gases being varied over 5 to 10 times the quantity of solution.

It was however established that the best proportion of solution to inert gases was 1 : 5, particularly when the vapor extracted from the gas current was used for heating the exhausted solution.

The inert gas was supplied at ambient temperature and the experimental procedure was regulated so that the inert gas cooled the solution to a temperature of 80° to 84°C. For this purpose, the flow of solution was appropriately regulated relative to the volume and height of the column.

The experiments were carried out for every type of solution and are shown in FIGS. 7, 8, 9, 10 and 11.

In the said Figures, the abscissae represent the initial degrees of carbonatation of the solution, while the ordinates represent the degrees of carbonatation obtained at the end of the experiment.

Also indicated on the graphs of these figures are the temperatures of the solutions on leaving the column and also indicated, between square brackets, are the temperatures of the inert gas charged with $H_2O$ and $CO_2$ emerging from the top of the column (in other words the dew point temperature).

The results set out in the aforesaid figures are analagous and similar to those obtained experimentally in case I, controlled flash, except for a slight drop due to the fact that the solution transport coefficient is slightly diminished by virtue of the lower temperature of these experiments as compared with those in case I.

In this case, it should also be noted that the regenerative effect achieved with the current of inert gases is maximum for the potassium arsenite solutions and then diminishes gradually for the other solutions. Even the MEA solutions have a substantial regenerative effect.

Figure 14:
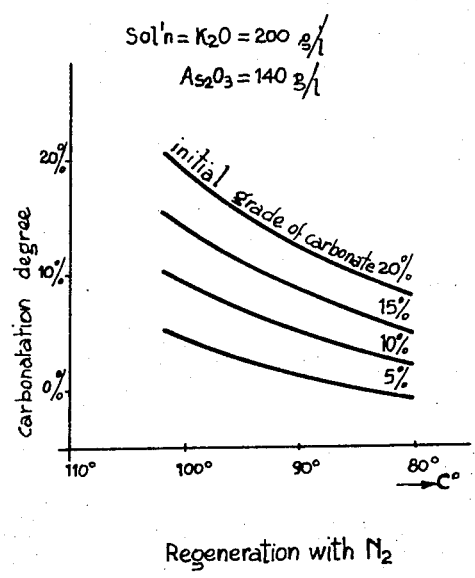
FIG. 14 shows the variation in final carbonate content with temperature of various potassium arsenite solutions having varying initial carbonate contents, during regeneration with an inert gas.

Further complementary experiments were carried out to ascertain the way in which the degree of carbonatation of the solution varies as the heat is extracted from the solution, the initial temperature of which is 102°C, in other words as the solution cools. These results are set out in FIG. 14 and relate to the use of a potassium arsenite solution preselected for the experiments by virtue of its wide industrial use.

It is now intended to present and illustrate the various methods, the object of the present invention, by which the vapor, after having been extracted from the hot or boiling regenerated solution, together with the $CO_2$ and/or other acid gases contained in the solution itself, is used for heating the exhausted solution.

It is worth while emphasizing two characteristic features, d) and e), which are specific features of the two aforesaid methods:

d. The passage of vapor from one solution to the other is spontaneous and requires no energy consumption (although theoretically this ought to arise) until such time as the regenerated solution is at a temperature or rather a vapor tension in $H_2O$ greater than that of the exhausted solution which receives the vapor itself. This is known in the industry and a man skilled in the art understands that the aforesaid method is quite different from that of extracting the vapor from the regenerated solution by means of a thermo-compressor and compressing it with this apparatus up to a sufficient pressure and temperature for utilization for example in the bottom of the regenerating column. In such a case, in fact, there is a consumption of energy which does not arise in the present invention.

It should be noted however that the vapor extracted from the regenerated solution contains, as previously stated, a certain quantity of $CO_2$ and/or other acid gases which modify the phenomenon and require a consumption of energy for passage from one solution to the other. However, the quantity of energy involved is quite small as will be stated at the end of the section g) below.

e. During the course of studies and appropriately conducted experiments, it has been found that the heat given off by the regenerated solution to the exhausted solution through the passage of vapor stream, as stated above, is used mostly and more conveniently than found with the heat exchanger hitherto employed in the industry. This is due to the fact that for parity of temperatures attained in heating, the exhausted solution eliminates a greater quantity of $CO_2$ and/or other acid gases and is therefore fed into the regenerating column under conditions more favorable to the thermal balance thereof.

In fact, in the hitherto known state of the art, the heat exchanger heats the exhausted solution when it is still under the pressure at which it emerges from the absorber; subsequently, the solution is expanded to the pressure of the regenerator and, as is well known, the heat consumed in this expansion is mainly expended in order to develop water vapor, this being a very rapid physical phenomenon, and in a lesser quantity for the development of $CO_2$ which is regulated by chemical reactions which are known to be slow. Finally, the ratio of $H_2O$ vapor/$CO_2$ is in considerable excess of equilibrium.

Nevertheless, by employing the heating method according to the present invention, the water vapor extracted from the regenerated solution condenses on the exhausted solution, heating it, and the $CO_2$ is ejected gradually as the heating takes place and finally the ratio of $H_2O$ vapor/degasified $CO_2$ is very close to that of equilibrium. This reveals a better utilization of the heat, as has been established and checked by appropriate experiments.

The said experiments consisted in reproducing the conditions of operation of the method which is the object of the present invention, in fact in passing a heating flow of $H_2O$ and $CO_2$ in various proportions, in direct contrast with an exhausted solution, in other words a solution with a high degree of carbonatation. For reasons of operative conveniences, the experiments were carried out at atmospheric pressure.

Figure 12:
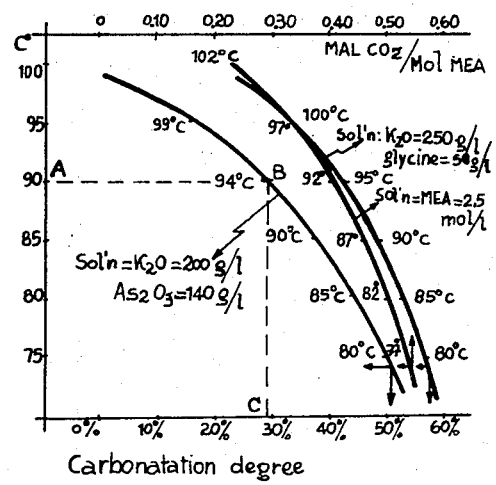
FIG. 12 shows the final carbonate contents of various absorbent solutions when passed against a $H_2O/CO_2$ heating stream at various temperatures.

The results are set out in FIG. 12, in which the ordinate represents the temperatures of the heating stream and the abscissa represents the degree of carbonatation at which the solution arrives after a certain time. The graphs in the Figure itself relate respectively to solutions of potassium arsenite, 200 g/l $K_2O$ and 140 g/l $As_2O_3$, solutions of potassium carbonate, 250 g/l $K_2O$ and activated with glycine at the rate of 50 g/l and to a solution of 2.5 mols/liter MEA. As is well known, the temperature of the heating stream depends on and determines the ratio of $H_2O/CO_2$ which is the dew point. Thus for example, referring to the potassium arsenite solution, a heating stream at a temperature of 90°C, in other words with a ratio of $H_2O/CO_2$ equal to 2.3 (point A on the figure), regenerates the solution to a 29 percent degree of carbonatation. (point C on the figure). From experiments, it is also known that the solution correspondingly acquired a temperature of 94°C approx. (point B of the figure); and here it is important to observe that from repeated experimental observations carried out for this purpose, it is revealed that the vapor + $CO_2$ flow heats the solution to a temperature higher than its own. This is a fact which is probably not widely known among men skilled in the art. For greater clarity, an experiment was conducted involving a saline solution, boiling at 105°C, as an example, which emitted vapor at a temperature of 100°C which is the boiling temperature of the pure solvent; a flow of pure vapor, saturated at 100°C, tends to heat a saline solution towards 105°C and thus to a temperature in excess of 100°C.

Referring now to the example given above concerning a potassium arsenite solution, it is in fact observed that in industrial practice an arsenite solution regenerated and heated to 110°C heats the exhausted solution up to 100° to 102°C. This latter, subsequently expanding before entering the regenerating column or in the upper part thereof, cools to approx. 95°C, but is regenerated only up to 44 to 48 percent instead of 29 percent as in the above-described example of application of the present method.

f. The considerations raised in the two previous sections d) and e) make it possible to establish certain criteria as to the suitability of application of the various methods of the present invention.

As stated at the beginning of the description, the stream of vapor extracted from the regenerated solution, in addition to eliminating a part of the $CO_2$ and/or other acid gases contained in the solution itself (this being the basic object) can also be used for heating the exhausted solution with which it is brought into direct contact, so dispensing with the need for the heat exchanger hitherto used in known techniques.

The two objects may be attained separately or jointly according to the type of solutions used and the operative cycle in which they are used.

In many cases, the extraction of vapor from the regenerated solution has a substantial regenerative effect, eliminating substantial quantities of $CO_2$ and/or other acid gases from the solution itself, making it possible not only to reduce considerably the supply of heat necessary for functioning of the cycle, but also, in one stage of working, to arrive at a degree of purity in the gaseous mixture which is generally obtained with a two-stage plant. All this has been previously demonstrated.

This takes place in cases of strongly activated solutions, such as is the typical case with arsenite solutions, on in cases of markedly regenerated solutions, in the actual regenerating column itself.

In contrast, the considerable quantities of $CO_2$ and/or other acid gases desorbed, which accompany the vapor, lower the dew point of the heating flow and render it less suitable for heating of the exhausted solution. Furthermore, the passage of $CO_2$ requires a certain consumption of energy which does not happen in the case of the vapor.

The solutions of this type are advantageously used in optimum or isothermic cycles, in which the heat exchanger does not exist or is not necessary. Particular examples of this application are given in examples 1, 3, 6. In these, it has been found suitable for the flow of vapor extracted from the regenerated solution to be condensed in suitable coolers or discharged to outside.

Vice versa, the solutions in which the regenerative effect is poor and in other words in which the vapor extracted from the regenerated solution is accompanied by small quantities of $CO_2$, offer the best conditions for heating of the exhausted solution and for partial or total abolition of the heat exchanger. This is the case with non-activated solutions, such as simple carbonate solutions or ethanol amine solutions and in general the solutions which have been strongly regenerated in the regenerator proper. The solutions used specifically for absorption of $H_2S$ are the most suitable for this case in that the volumes of $H_2S$ absorbed per volume of solution are in the majority of cases of a small amount and therefore the vapor extracted from the regenerated solution is in a very high concentration.

The above-mentioned solutions are preferred in conventional cycles and in fact in any cycles in which there is a difference in temperature between the absorption phase and a regeneration phase and in other words in cycles in which the heat exchanger has been used hitherto.

Particularly advantageous are cases in which both the aforesaid advantages can be used at the same time. Examples of these cases are given in examples, 2, 4, 5.

g. In the practical application of the present invention, the vapor which is extracted from the regenerated solution is brought into contact with the exhausted solution by mixing apparatus (mixing or reheating zone), so that this can take place in a single stage, as is sufficient in the majority of cases, or in a plurality of successive stages if it desired that the exhausted solution be heated to a temperature close to that of the regenerated solution. This can be carried out with the apparatus shown in FIG. 21 or with similar apparatuses which are easily available to a man skilled in the art. In the case of the apparatus in FIG. 21, the flow of vapor is extracted from the regenerated solution in successive stages while the latter is rising along the column shown on the right of the figure; the vapor extracted at each individual stage is passed to the exhausted solution emerging from the absorber and which descends along the column shown on the left of the figure, in a like number of stages which are respectively and correspondingly successive.

If the exhausted solution is used to produce vacuum in an ejector, the ejector itself performs the mixture of the vapor with the solution (in a single stage or with multiple ejectors). In many cases, however, the simple ejector is sufficient to achieve the purpose (see FIG. 16).

Figure 19:
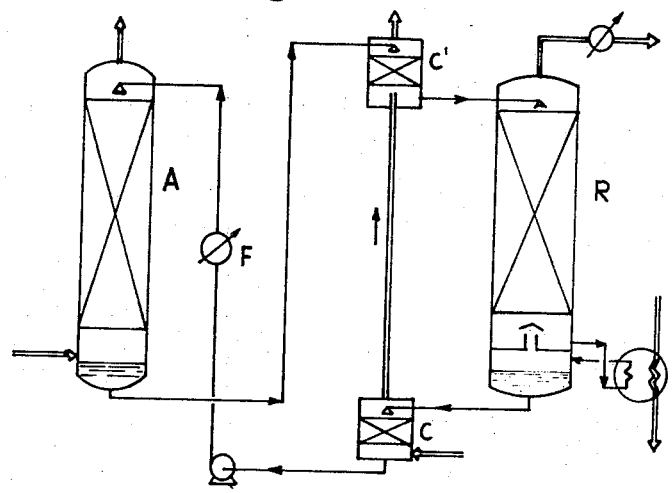

On the other hand, when the regenerated solution is processed with the current of inert gases, the passage of heat from the regenerated solution to the exhausted solution takes place via two zones, generally two columns provided with filling material or some other similar apparatus, traversed respectively by the regenerated solution and by the exhausted solution; the current of inert gases passes first through the heating or vaporization zone which is traversed by the regenerated solution, where it becomes heated and humidified at the expense of the heat removed from the regenerated solution and subsequently it passes into the heating or mixing zone which is traversed by the exhausted solution in which it heats the solution itself, condensing the vapor entrained and at the same time producing a pre-regeneration of the exhausted solution as indicated in FIG. 19 and in example 5.

Figure 18:
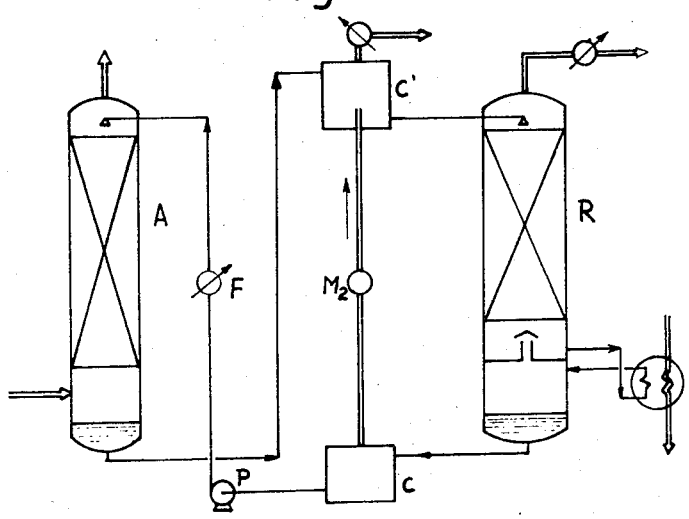

In the practical application of the present invention, it is observed that the regenerated solution, in reference to cases 1 and 2, in which the vapor is extracted by decompression, it at a lower pressure than the exhausted solution. In this case, if it is not desired to use the ejector, it is necessary to use a mechanical propulsion means which is generally located between one column and the other as indicated in FIG. 18.

As stated previously, the passage of steam from one solution to the other does not consume energy, whereas energy is consumed in the passage of the $CO_2$ which accompanies the vapor extracted from the regenerated solution. The amount of energy consumed is small.

In fact, even with the object of guiding a man skilled in the art, in making his choice from among the aforesaid criteria of suitability, it is pointed out that the expenditure of energy for passage of the $CO_2$ which accompanies the vapor, from the regenerated solution to the exhausted solution, is calculated theoretically at 0.013 Kw/hr. $\times$ 1,000 calories in the case of an alkaline arsenite solution which, expanding from 126°C to 104°C, is regenerated from a 20 percent carbonatation level to 3.5 percent, developing a heating flow with a proportion of $H_2O$ vapor/$CO_2$ of 5.4.

Figure 22:
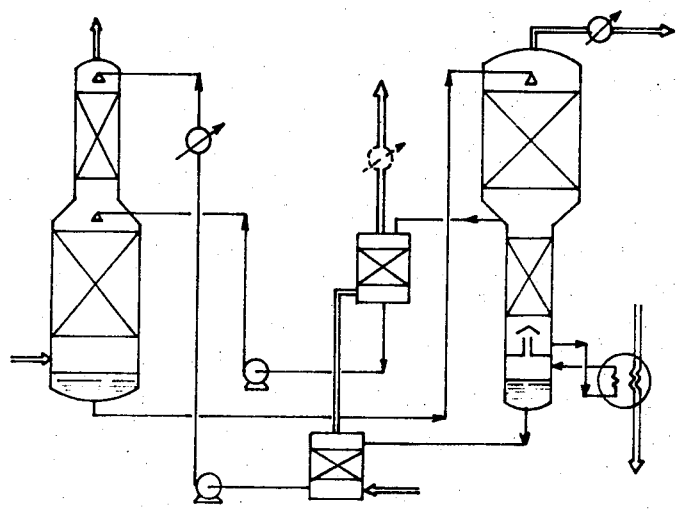

On the other hand, in the case of a monoethanol amine solution of 2.5 mol/liter, which expands from 126°C to 104°C, regenerating from 20 percent carbonatation to 15 percent, the consumption of power is calculated at 0.0047 Kw/hr. per 1,000 calories transported from one solution to the other.

h. Finally, it should be noted that, as has been stated several times already, the extraction of the vapor stream cools the regenerated solution. As is well known to a man skilled in the art, this has the advantage that the solution is passed to the absorption column, partly or wholly eliminating the cooler.

i. The present invention can obviously be applied to two stage cycles also. FIG. 22 shows an application of the present invention to a two stage cycle in which the solutions regenerated in the first and second stages are treated with a flow of inert gases in order to improve their degree of regeneration.

Examples of practical application of the present invention will be given hereinafter:

The following example relates to a case of practical application as stated in 1.

EXAMPLE 1

Figure 15:
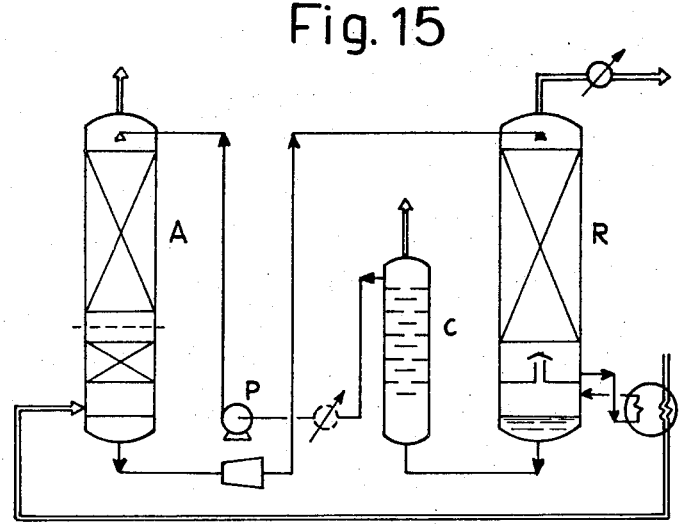
FIGS. 15-22 illustrate apparatus which may be employed in the practice of the present invention.

With reference to FIG. 15, a plant for eliminating $CO_2$ from a gas at 28 atm. with an initial concentration of 18 percent $CO_2$ is washed with an alkaline arsenite solution consisting of 200 g/l $K_2O$ and 140 g/l $As_2O_3$.

The exhausted solution emanating from the bottom of the absorber is passed to the top of the regenerating column R, operating at 8 atm., where it is regenerated to a level of 20 percent carbonatation by the supply of 21,000 Kcal/cu.m. of solution.

The regenerated solution is extracted from the bottom of the regenerator at a temperature of 126°C which is the boiling temperature corresponding to the working pressure of the regenerator itself, and it is subsequently passed to the expansion column C which in FIG. 15 is situated on the left of the regenerating column R. This column is equipped with plates or filling material and is filled to about 8 m by the solution itself. This latter, as it rises along the column, develops vapor gradually and progressively, which eliminates part of the $CO_2$ contained in the solution.

When expansion is complete, at the top of the column C, the solution has reached a degree of 3.5 percent of carbonatation and its temperature is 105°C.

The solution is drawn off at the top of the expansion column by means of the pump P and is fed back to the absorption column A suitably cooled by a subsequent cooler in one stream only or in split stream according to the purification required.

The solution then passes through the absorption column from the bottom of which it is drawn off with a degree of carbonation of 66.5 percent and is passed directly to the regenerating column.

It will be observed that the solution is regenerated in the regenerating column to a degree of carbonatation of 20 percent by the supply of heat to the extent of 21,000 kg.cal./cu.m. of solution, while to obtain a degree of 3.5 percent carbonatation in the solution such as emerges from the expansion column C, it would have been necessary to supply heat to the extent of 37,400 kg.cal/cu.m. of solution, in other words virtually twice the amount.

In the example it has been shown that the supply of heat in the reboiler is carried out by using the process gas, which emerges from the reboiler itself at a temperature of approx. 135°C. It is considered suitable to pass it at the same temperature to the bottom of the absorber where it heats the solution to a temperature suitable for the thermal balance of the regenerator. This has been described in Italian Pat. application No. 53,496 and its supplement No. 51,505, and in Patent application No. 53475-A/68.

It will be observed that the solution absorbs approx. 30 parts $CO_2$ per cu.m. of solution; the heat consumed is 700 kg.cal./cu.m. of $CO_2$ absorbed.

It will finally be observed that the vapor extracted in the expansion column C contains only a fraction of the $CO_2$ absorbed. In some cases, therefore, when it is not necessary to recover all the $CO_2$, the vapor extracted from the expansion column may be passed directly to the atmosphere with a resultant saving on the size of the $CO_2$ cooler.

The advantages demonstrated by the present example reside basically in the fact that a) the purification of the gas takes place in a single stage and a degree of purity is achieved which, by the hitherto known techniques, would have required a two stage cycle; b) the supply of heat and consequently the dimensions of the reboiler are approximately close to half; also the size of the regenerator is consequently reduced; c) as stated above, the $CO_2$ cooler may also be made smaller if total recovery of the $CO_2$ absorbed is not required.

EXAMPLES 2 AND 3

Here are given two parallel examples of practical application, along the lines set forth in section 2.

Figure 17:
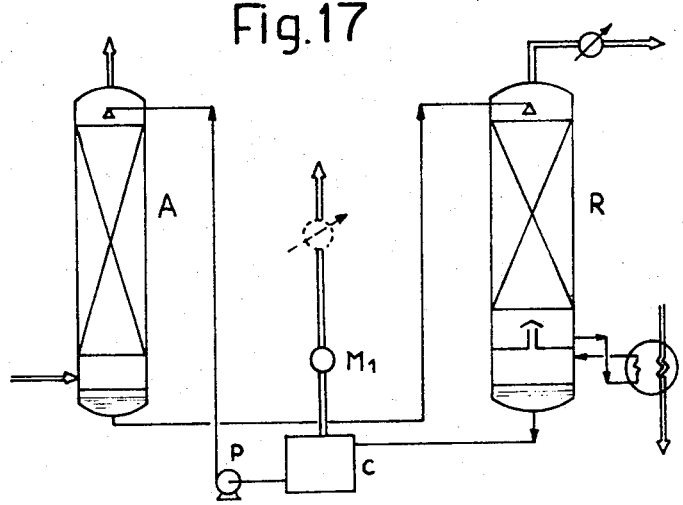

The two examples are shown in FIGS. 17 and 18 respectively. Both relate to the decarbonatation of a gaseous mixture containing 18 percent $CO_2$ and at a pressure of 29 atm. by a potassium arsenite solution containing 200 g/l $K_2O$ and 140 g/l $As_2O_3$. In both cases, the solution is regenerated in the regenerator R by the supply of 26,400 kg.cal./cu.m. of solution which corresponds to having a regenerated solution with a degree of 10 percent carbonatation. In both cases, the regenerated solution, with an initial temperature of 110°C, is treated in the vaporization chamber C so as to extract from it a current of vapor corresponding to cooling of the solution to approx. 85°C, so obtaining an improvement in the degree of regeneration of the solution to 2 percent (see FIG. 13). It is however noted that in practice, substantially better figures were often obtained.

In the cycle referred to in FIG. 17, the stream of vapor thus extracted is discharged to outside without being further used, while the solution emerging from the vaporization zone or chamber C is passed without being further cooled (being already cooled to 85°C) to the top of the absorber A where it purifies the gaseous mixture down to 0.1% $CO_2$. The solution, descending through the absorber, becomes heated by the heat of reaction and by the heat content of the gas (supplied at 120°C, which is the temperature at which it leaves the reboiler) up to 98°C, reaching a degree of carbonatation of 64 percent and being passed directly to the regenerator. In keeping with the variation in the degree of carbonatation, 64% $\rightarrow$ 2%, the charge containing solution is 29.5 parts $CO_2$ per part of solution and the consumption of heat is 895 kg.cal./nominal cu.m. $CO_2$.

In the cycle referred to in FIG. 18, on the other hand, the current of vapor extracted from the chamber C is passed to the chamber C' where it is used for heating the exhausted solution originating from the bottom of the absorber A. Consequently, it has been possible to diminish the absorption temperature and in fact the regenerated solution is cooled down to 58°C in the cooler F and passed to the top of the absorber A, where it purifies the gaseous mixture down to 0.05 percent $CO_2$; as it descends through the absorber, it becomes heated up to 80°C by the heat of reaction and by the heat in the gaseous mixture which is supplied at 120°C, and reaches a degree of carbonatation of 73.5 percent; it is finally passed into a chamber C' where it is heated by the stream of vapor emerging from the chamber C; it is subsequently passed into the regenerator. In keeping with the variation in the degree of carbonatation from 73.5 percent to 2 percent, the charge in the solution is 34 parts $CO_2$ per part of solution and the consumption of heat is 770 kg.cal./nom.cu.m. of $CO_2$.

In order to extract the current of vapor from the vaporization chambers, vacuum pumps were used, denoted by reference letters M1, M2, the said pumps being applied on the streams of vapor emerging from the vaporization chambers.

The advantages of the present invention, clearly disclosed by the two foregoing examples, can be summarized as follows:

a. Reduction in the regeneration heat; The heat required to regenerate 1 cu.m. of solution to a degree of carbonatation of 10 percent is 26,400 kg.cal., whereas the heat required to regenerate it down to 2 percent carbonatation is 40,500 kg.cal. The invention allows the solution to be regenerated down to 2 percent carbonatation by the amount of heat normally required to achieve 10 percent carbonation. This represents a saving of 14,100 kg.cal./cu.m. of solution, in other words approx. 35 percent.

b. The single stage cycle is sufficient to achieve purification to 0.05 to 0.1 percent $CO_2$, with a consumption of heat substantially below 1,000 kg.cal./nom.cu.m. $CO_2$; in the known techniques, this necessitated a two-stage cycle. This advantage is obviously of fundamental importance.

c. It will be observed that in example 3 which employs a conventional cycle in which the absorption temperature is substantially less than the regeneration temperature, the heat exchanger between the regenerated solution and the exhausted solution is eliminated.

Example 2 on the other hand uses the optimum cycle as stated at the beginning of the present description.

EXAMPLE 4

Example 4 relates to a practical embodiment in which the ejector is used.

Figure 16:
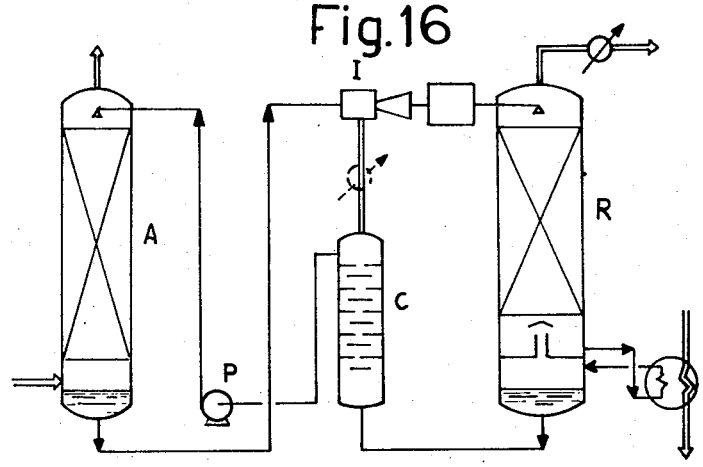

This exemplary embodiment is entirely similar to example 3 referred to hereinabove. With reference to FIG. 16, the ejector I replaces the vacuum pump M1 and the mixing chamber C' in FIG. 4. In it, as will be readily understood by a man skilled in the art, the exhausted solution originating from the absorber, traverses the ejector I in which it creates a negative pressure which is exerted on the vaporization chamber C from which it extracts a stream of vapor which becomes blended in the ejector itself and in the subsequent chamber so as to heat the solution before this latter is introduced into the regenerating column.

The remaining details concerning operation of the plant are similar to those set forth in example 3.

EXAMPLES 5 AND 6

Here are given two parallel examples which relate to the case where the stream of vapor is extracted by means of an inert gas current.

Figure 20:
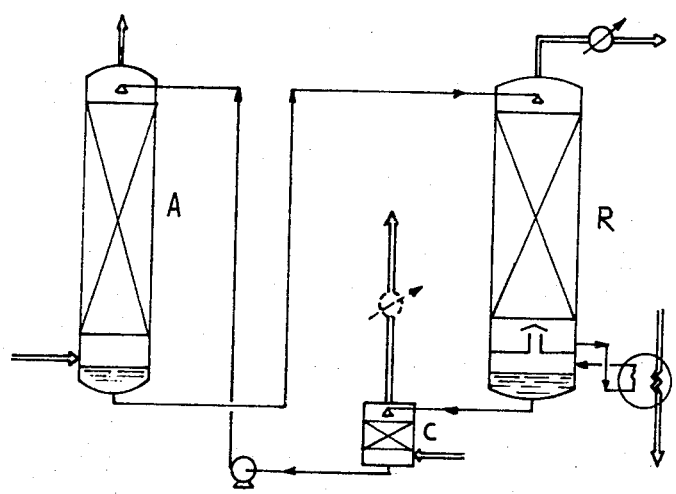

The two examples are shown in FIGS. 19 and 20 respectively. Both relate to the decarbonatation of a gaseous mixture containing 21% $CO_2$ at a pressure of 36 atm., using a potassium arsenite solution containing 200 g/l $K_2O$ and 140 g/l $As_2O_3$. In both cases, the solution is regenerated in the regenerator R by the supply of 21,600 kg.cal./cu.m. of solution which corresponds to having a solution regenerated to 15 percent $CO_2$ content.

The solution extracted from the bottom of the regenerator is treated by a current of inert gases with which it is brought into intimate and direct contact in the vaporization chamber C in which the solution is cooled down to 85°C and is regenerated to a 4% $CO_2$ content. During this treatment, it has been established that it is necessary to use 4 cu.m. of inert gas per cu.m. of solution and it is observed that this quantity of inert gas is readily available in the waste from ammonia synthesis (in other words waste which is used to avoid the accumulation of methane or other inert gases in the gases circulating in the synthesizing plant).

According to the cycle illustrated in FIG. 20, the solution which, after treatment with the inert gases, is regenerated to a degree of carbonatation of 4 percent and is cooled down to 85°C, is passed directly and without further cooling to the absorption column A where a degree of purification to 0.10% $CO_2$ is attained. Subsequently, the solution descends through the absorber, reaching at the bottom a temperature of 98°C due to the heat of reaction and the heat contained in the gas to be purified, which is fed in at a temperature of 120°C as it emerges from the reboiler. The solution at this temperature is finally passed directly into the regenerating column, completing the cycle. The inert gases on the other hand, after being treated in intimate and direct contact with the exhausted solution in the chamber C, are discharged to the outside.

The solution which, at the bottom of the absorber, attains a degree of carbonatation of 71 percent, has a charge of 32 parts $CO_2$ per part of solution; the heat consumption is 675 kg.cal./cu.m. $CO_2$.

According to the cycle illustrated in FIG. 19, on the other hand, the inert gases, after having been brought into intimate and direct contact with the solution regenerated in zone C, from which they emerge heated and humidified, are passed into the zone C' where they are used to heat the exhausted solution emerging at the bottom of the absorber. This has made it possible advantageously to reduce the absorption temperature. Consequently, the regenerated solution is subsequently cooled from 85°C to approx. 60°C and passed to the top of the absorber A where it purifies the gaseous mixture down to 0.05 percent $CO_2$; subsequently, descending through the absorption column A, it becomes heated to 80°C due to the heat of reaction and the heat in the gaseous mixture. It is subsequently passed into the zone C' where the current of inert gases originating from C heats it to a temperature of approx. 94°C and eliminates a quantity of $CO_2$, regenerating the solution down to a carbonatation level of 35 percent. Finally, it passes to the regenerating column.

In this example, the charge in the solution is 37 parts $CO_2$ per part of solution and the consumption of heat is 585 kg.cal./cu.m. $CO_2$.

It should be noted that the current of inert gases which have eliminated the $CO_2$ both from the regenerated solution and possibly also from the exhausted solution is discharged into the atmosphere. This constitutes a reduction in the quantity of $CO_2$ emerging from the regenerator and available for other purposes. In the first case, FIG. 20, the $CO_2$ lost is a substantial fraction of the total while in the second case, FIG. 19, it is only 16.5 percent.

As will be known to a man skilled in the art, the first case represents the application of a conventional cycle in which, in addition to improving the regenerative effect obtained by the treatment with inert gases in the regenerated solution, it is also possible to dispense with the heat exchanger between the regenerated solution and the exhausted solution; in the second case, on the other hand, the optimum cycle is applied in which, in addition to improving the regenerative effect of the regenerated solutions, there is the advantage that the absorption temperatures vary within 85° and 100° approx., becoming advantageously close to the optimum absorption temperatures.

EXAMPLE 7

This example relates to the case where a monoethanol amine solution is used. In a conventional $CO_2$ purification plant employing the conventional cycle and using monoethanol amine solution in a concentration of 2.5 mols/liter, it should be noted that the solution is passed to the head of the stripper at a temperature of 96°C. approx. (205°F) and emerges at the bottom of the regenerator with a $CO_2$ content of 0.14 mols $CO_2$ per mol MEA and at temperature of 120°C (248°F). Subsequently, the regenerated solution, passing in counter current through a heat exchanger, heats the exhausted solution emerging from the absorber to a temperature of 96°C, as stated above.

The above-mentioned plant is modified and improved as follows:

a. The solution is regenerated in the regenerating column to a $CO_2$ content of 0.18 mols $CO_2$ per mol MEA with a corresponding saving on the supply of heat to the reboiler. Subsequently, the solution is treated in an expansion chamber using negative pressure generated by a vacuum pump and is cooled to approx. 100°C (212°F), eliminating $CO_2$, and attains a $CO_2$ content of 0.14 mols per mol MEA, which was the level attained in the plant operating by the conventional system.

Figure 21:
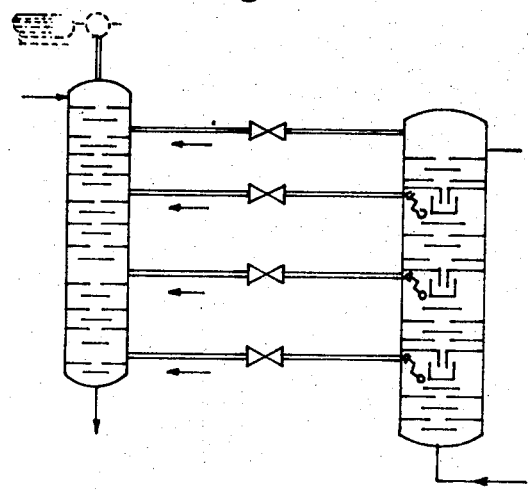

The vapor extracted by the vacuum pump is brought into intimate and direct contact with the exhausted solution emerging from the absorber, heating it to approx. 96°C. In the event of the solution originating from the absorber at a temperature of approx. 85°C (185°F), a single heating and mixing stage is adequate between the extracted vapor and the exhausted solution and this is sufficient for the heat exchanger to be completely eliminated. On the other hand, if the exhausted solution emerges from the absorber at a lower temperature, it is still possible partially to use the exchanger or an apparatus may be used for heating and mixing the vapor and solution in multiple stages, as indicated in FIG. 21.

The scheme can be particularly simplified by using the ejector in which use is made of the energy contained in the exhausted solution. This makes it possible to dispense with the vacuum pump while the ejector itself can operate as a heating and mixing chamber.

EXAMPLE 8

This example concerns the elimination of hydrogen sulphide by means of solutions of diethanolamine in a concentration of 2 N/liter.

The installation employing the conventional layout provides for the temperature at the top of the regenerating column to be about 98°C. (208°F.) and for the temperature at its base to be about 124°C. (256°F.). The solution is withdrawn from the base of the column at the said temperature and has a content of approx. 0.12 mol. of hydrogen sulphide per mol. of amine. With reference to FIG. 18, the solution is fed into the expansion chamber C, where it is subjected to a pressure drop created by suitable mechanical means M2 and cooled to a temperature of about 100°C. (212°F.). In these conditions, the steam extracted from the solution is practically free from acid gases and hence is utilized in the heating chamber C' in the best of conditions for there heating the exhausted solution taken from the absorption column.

The exhausted solution reaches the heating chamber C' at a temperature of 74°C. (165.2°F.) and is heated to a temperature of 96°C. (204.8°F.) and then passed to the top of the regenerator column. The heating of the exhausted solution from the temperature of about 40°C. (104°F.), as it arrives from the absorption column, to the temperature of 74°C. is effected by means of a partial heat exchanger, in which it is brought into contact with the regenerated solution leaving the expansion chamber C. In this way, the exchanger in the conventional cycle is partly eliminated. If desired, the exchanger can be eliminated altogether by adopting the arrangement shown in FIG. 21.

The above example is particularly advantageous using the ejector following the heating chamber C', in which the heating of the solution produces only slight evolution of acid vapor, which have no undue effect on the performance of the ejector.

We claim:

1. In a process of eliminating acid gases selected from the group consisting of $CO_2$, $H_2S$ and mixtures thereof from gaseous mixtures containing them, using a regenerable absorbent solution which is circulated between an absorption zone in which the solution is brought into intimate and direct contact with the gaseous mixture in order to purify it and to eliminate said acid gases from it and a regenerating zone in which the solution is brought to the boil by externally supplied heat, with the expulsion of said acid gases previously absorbed, the improvement which comprises:

passing the hot and boiling solution extracted from the regenerating zone and containing residual absorbed acid gases to an expansion zone maintained at a pressure substantially lower than the pressure existing in the regenerating zone;

generating from the solution undergoing expansion a stream of vapor;

eliminating with the said stream of vapor part of said acid gases still contained in the solution itself and in thus cooling the solution;

restoring the thus cooled solution which has a lesser content of said acid gases to the absorption zone;

passing the stream of vapor together with said acid gases extracted from the solution to a heating zone;

passing to the said heating zone the exhausted solution originating from the absorber and bringing it into intimate and direct contact with the vapor, with resultant heating of the solution and condensation of the vapor;

extracting the solution from the heating zone and passing it into the regenerating zone; and discharging the said acid gases from the system.

2. In a process of eliminating acid gases selected from the group consisting of $CO_2$, $H_2S$ and mixtures thereof from gaseous mixtures containing them, using a regenerable absorbent solution which is circulated between an absorption zone in which the solution is brought into intimate and direct contact with the gaseous mixture in order to purify it and eliminate said acid gases from it and a regenerating zone in which the solution is brought to the boil by externally supplied heat with the expulsion of said acid gases previously absorbed, the improvement which comprises:

passing the hot and boiling solution extracted from the regenerating zone and containing residual absorbed acid gases to a vaporization zone;

passing a current of inert gases into the said vaporization zone;

bringing the said current of inert gases into intimate and direct contact with the solution;

extracting therefrom a stream of vapor and eliminating part of said acid gases still contained in the solution together with the said stream of vapor and inert gases whereby the solution is cooled;

restoring the thus cooled solution which has a lesser content of said acid gases to the absorption zone;

extracting from the vaporization zone the stream of vapor and inert gases together with said acid gases eliminated from the solution;

passing the said stream of vapor and inert gases together with said acid gases to a heating zone;

passing the exhausted solution emerging from the absorber into the said heating zone and bringing into intimate and direct contact with the vapor, with resultant heating of the solution and condensation of the vapor;

extracting the solution from the heating zone and passing it to the regenerating zone; and discharging said acid gases from the system.

3. In a process as claimed in claim 1, the further improvement which comprises using an expansion zone from which the stream of vapor and said acid gases are extracted composed of successive stages whereby the vapor and said acid gases extracted from each individual stage of the said zone is passed to successive and corresponding stages in the heating zone in contact with the exhausted solution.

* * * * *

UNITED STATES PATENT OFFICE
CERTIFICATE OF CORRECTION

Patent No. 3,714,327                              Dated   January 30, 1973

Inventor(s)  Giuseppe Giammarco

It is certified that error appears in the above-identified patent and that said Letters Patent are hereby corrected as shown below:

In The Heading:

The Assignee's name was omitted. Should read:

--Assignee: Vetrocoke Cokapuania S.p.A., Venezia Porto Marghera, Italy (one half)--

The Priority Date was omitted. Should read:

--Italy            October 15, 1968........  53496-A/68
  Italy            April 19, 1969..........  51505-A/69   --

Signed and sealed this 3rd day of July 1973.

(SEAL)
Attest:

EDWARD M. FLETCHER, JR.           Rene Tegtmeyer
Attesting Officer                 Acting Commissioner of Patents